(12) United States Patent  
Dvornik et al.

(10) Patent No.: US 12,223,985 B2
(45) Date of Patent: Feb. 11, 2025

(54) GROUNDING FLOW GRAPHS IN SIGNALS

(71) Applicant: SAMSUNG ELECTRONICS CO., LTD., Suwon-si (KR)

(72) Inventors: Mikita Dvornik, Toronto (CA); Isma Hadji, Toronto (CA); Allan Douglas Jepson, Oakville (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 18/103,101

(22) Filed: Jan. 30, 2023

(65) Prior Publication Data

US 2023/0282245 A1 Sep. 7, 2023

Related U.S. Application Data

(60) Provisional application No. 63/317,432, filed on Mar. 7, 2022.

(51) Int. Cl.
| | | |
|---|---|---|
| *G11B 27/34* | (2006.01) | |
| *G06F 16/732* | (2019.01) | |
| *G06F 16/783* | (2019.01) | |
| *G06V 10/86* | (2022.01) | |
| *G06V 20/40* | (2022.01) | |
| *G11B 27/10* | (2006.01) | |

(52) U.S. Cl.
CPC .......... *G11B 27/34* (2013.01); *G06F 16/7328* (2019.01); *G06V 10/86* (2022.01); *G06V 20/44* (2022.01); *G11B 27/102* (2013.01)

(58) Field of Classification Search
None
See application file for complete search history.

(56) References Cited

U.S. PATENT DOCUMENTS

| | | |
|---|---|---|
| 10,423,395 B2 | 9/2019 | Stanfill et al. |
| 10,825,227 B2 | 11/2020 | Amer et al. |
| 2015/0050006 A1* | 2/2015 | Sipe .......... H04N 9/87 386/241 |
| 2017/0213089 A1* | 7/2017 | Chen .......... G06V 20/10 |
| 2021/0271886 A1 | 9/2021 | Zheng et al. |
| 2022/0237043 A1 | 7/2022 | Hadji et al. |
| 2022/0300417 A1* | 9/2022 | Hajewski .......... G06F 16/24568 |

OTHER PUBLICATIONS

Huang et al., "Finding 'It': Weakly-Supervised Reference-Aware Visual Grounding in Instructional Videos," IEEE Computer Society, 2018 IEEE/CVF Conference on Computer Vision and Pattern Recognition, pp. 5948-5957. (Year: 2018).*

* cited by examiner

*Primary Examiner* — Hung Q Dang
(74) *Attorney, Agent, or Firm* — Sughrue Mion, PLLC

(57) ABSTRACT

A first graph which is a flow graph is converted into a second graph using a first algorithm. The second graph, combined with a second algorithm using a dynamic programming recursion, is compared with a video and a best matching thread, with respect to the video, is found through the second graph. The best matching thread may then be used for a user-assistance function. The dynamic programming recursion reduces computational effort needed by the computer performing the matching.

18 Claims, 9 Drawing Sheets

GROUNDING FLOW GRAPHS IN SIGNALS

CROSS REFERENCE TO RELATED APPLICATION(S)

This application claims priority to U.S. Provisional Application No. 63/317,432, filed Mar. 7, 2022; the content of which is hereby incorporated by reference.

FIELD

The present disclosure is related to multi-step localization in videos.

BACKGROUND

Recognized events in one or more videos may be described with a flow graph.

Then, an association of the flow graph to a previously-unseen video may be referred to as flow graph to video grounding. Flow graph to video grounding is the process of recognizing a particular ordering of events in the video as a topological sort of the corresponding steps in the flow graph. A brute force approach to flow graph to video grounding is to consider every topological sort of the flow graph and consider each topological sort as a candidate event sequence. Each candidate event sequence is then matched with the video and the closest candidate event sequence by some measure, for example alignment cost, is selected as representing the actual sequence of events in the video. Brute force search is computationally inefficient.

SUMMARY

Determining a sequence of events in a video is a computationally-expensive task. The brute force method is an inefficient inference method.

Recognizing events in a video stream is useful. For example, a personal assistant may process a query to find an event in a video; this is an example of content addressability. Also, a personal assistant may observe an on-going process and provide information on a next step. This is an example of determining candidate next steps. Computational efficiency is needed to provide these functions.

The present application solves the problem of flow graph to video grounding by providing a graphical structure called tSort and an algorithm for aligning a video with the tSort graph.

A first algorithm is provided for obtaining the tSort graph from a flow graph. The flow graph may be referred to as a first graph and the tSort graph may be referred to as a second graph.

A second algorithm is provided for grounding a video to the tSort graph. The second algorithm, in some embodiments, uses a dynamic programming recursion.

Provided is a method including obtaining a second graph, wherein the second graph is formed from a first graph, wherein the first graph is a flow graph and the second graph encodes topological sorts of the first graph; aligning the second graph to a video, wherein the aligning obtains a start time and an end time of an event in the video, wherein the one or more events are covered by the second graph; and performing a user-assistance function based on the Also provided is an apparatus including one or more processors; and one or more memories storing instructions, wherein an execution by the one or more processors of the instructions is configured to cause the apparatus to: obtain a second graph, wherein the second graph is formed from a first graph, wherein the first graph is a flow graph and the second graph encodes topological sorts of the first graph; align the second graph to a video, wherein the aligning obtains a start time and an end time of an event in the video; and perform a user-assistance function based on the start time and the end time of the event.

Also provided herein is a non-transitory computer readable medium storing instructions for execution by a computer, wherein the execution by the computer of the instructions is configured to cause the computer to obtain a second graph, wherein the second graph is formed from a first graph, wherein the first graph is a flow graph and the second graph encodes topological sorts of the first graph; align the second graph to a video, wherein the aligning obtains a start time and an end time of an event in the video; and perform a user-assistance function based on the start time and the end time of the event.

Also provided herein is a method including obtaining a second graph, wherein the second graph is formed from a first graph, wherein the first graph is a flow graph and the second graph encodes topological sorts of the first graph; aligning the second graph to a video, wherein the aligning obtains a start time and an end time of an event in the video; receiving, from a user, a query as to the event in the video; cueing, based on the query and the second graph, the video to the start time of the event in the video; and displaying the video to the user beginning at the start time of the event.

Also provided herein is a method including obtaining a second graph, wherein the second graph is formed from a first graph, wherein the first graph is a flow graph and the second graph encodes topological sorts of the first graph; aligning the second graph to a video, wherein the aligning obtains a start time and an end time of an event in the video; and observing one or more recent operations of a user; receiving a query from the user as to candidate next steps; and communicating, based on the query, the second graph and the one or more recent operations of the user, one or more candidate next steps to the user.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Figure 1:
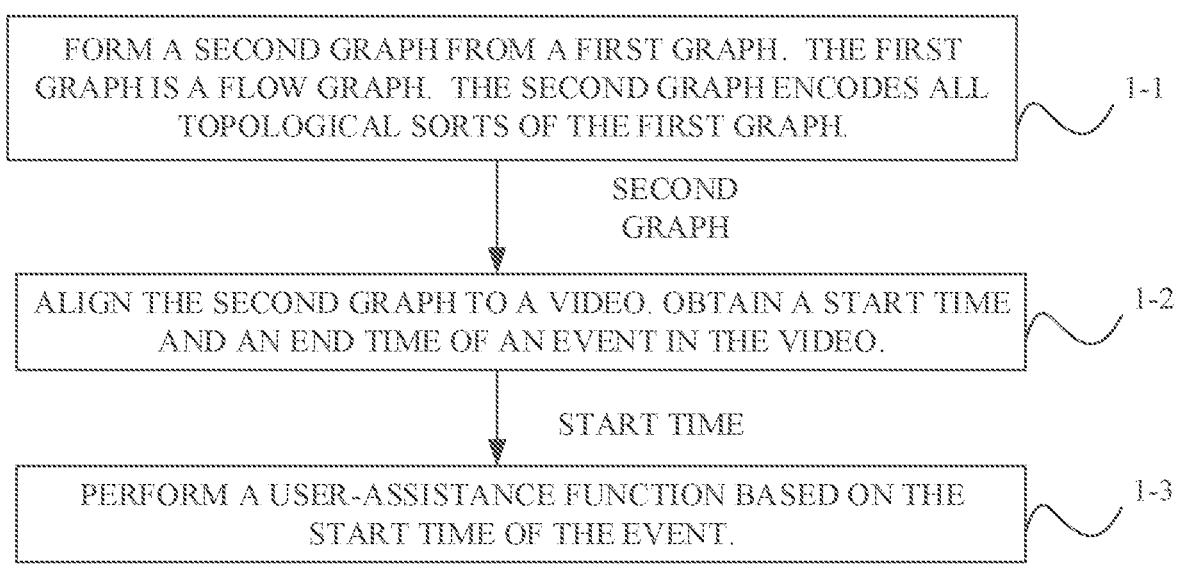
FIG. 1 illustrates logic for aligning a second graph to a video and performing a user-assistance function, according to some embodiments.

FIG. 1 illustrates logic 1-10 encoding all topological sorts of a flow graph in a second graph and performing a user-assistance function using the second graph. At operation 1-1, a second graph is formed from a first graph, where the first graph is a flow graph. The flow graph may be produced based on a collection of one or more videos. The second graph encodes all topological sorts of the first graph. At operation 1-2 the second graph is aligned to a video. The video may be, for example, a previously-unseen video not belonging to the collection of one or more videos. The aligning to the video provides a start time and an end time of an event. Generally, the aligning may provide start and end times of respective several events in the video. At operation 1-3, a user-assistance function is performed based on, for example, the start time.

Figure 2A:
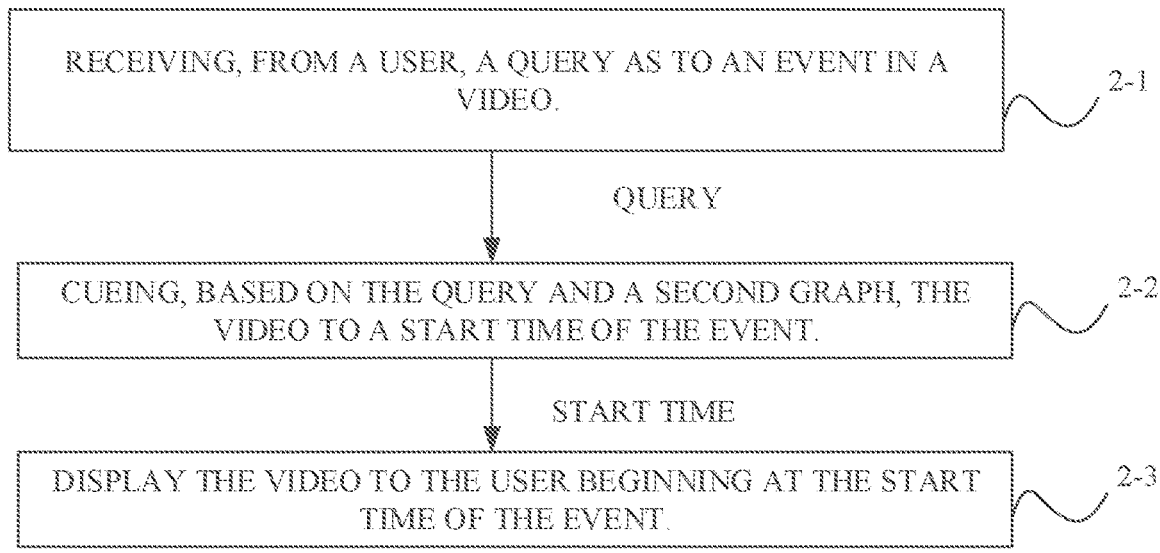
FIG. 2A illustrates a user-assistance function of content addressability, according to an example embodiment.

FIG. 2A illustrates logic 2-10 for a user-assistance function of content addressability. At operation 2-1, a query is received from a user as to an event in a video. At operation 2-2, the video is cued to a start time of the event. At operation 2-3, based on the start time, the video is displayed to the user beginning at the start time of the event described in the query from the user.

Figure 2B:
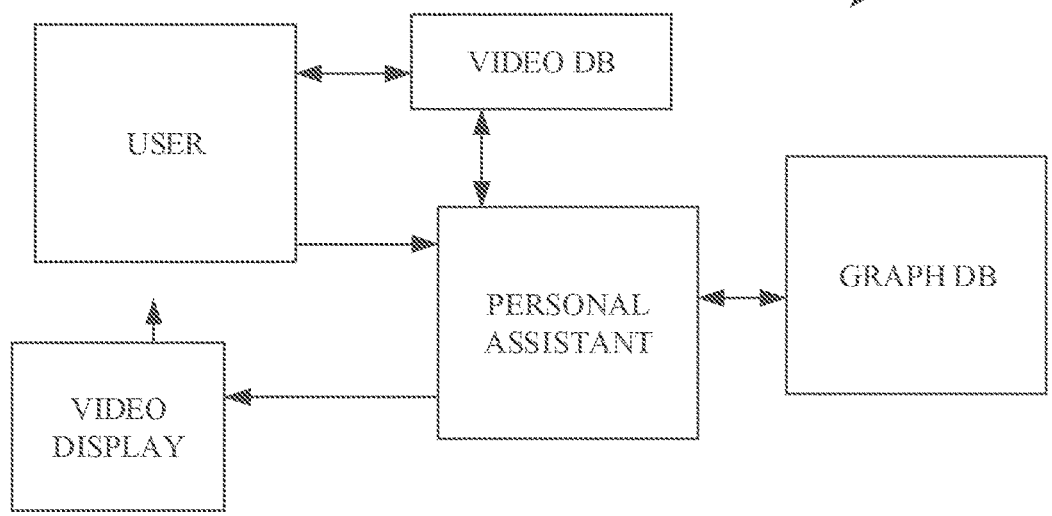
FIG. 2B illustrates a system related to content addressability, according to an example embodiment.

FIG. 2B illustrates a system 2-20 including a video database (DB), a personal assistant, a graph DB and a video display. The system is used by a user. Following the logic 2-10, the user may provide a query to the personal assistant concerning a video from the video DB. The personal assistant may obtain a graph (the second graph of logic 2-10) from the graph DB. The personal assistant may consider the video referred to by the user from the video DB and identify the start time of the event the user inquires about. The personal assistant then commands the video display to display the video to the user starting from the start time.

Thus, in some embodiments, a user-assistance function includes providing of content addressability to a user by receiving, from the user, a query as to the event in the video, cueing, based on the query and the second graph, the video to the start time of the event in the video, and displaying the video to the user beginning at the start time of the event.

Some embodiments also include obtaining the second graph. The second graph is formed from the first graph as mentioned above. The first graph is a flow graph and the second graph encodes topological sorts of the first graph. The embodiments include aligning the second graph to a video. The aligning obtains a start time and an end time of an event in the video. The embodiments include receiving, from the user, a query as to an event in the video. In some embodiments, cueing is performed, based on the query and the second graph, to cue the video to the start time of the event in the video and display the video to the user beginning at the start time of the event.

Also, as shown in FIG. 2A and FIG. 2B, embodiments include obtaining the video from a video database, and obtaining the second graph from a graph database.

Figure 3A:
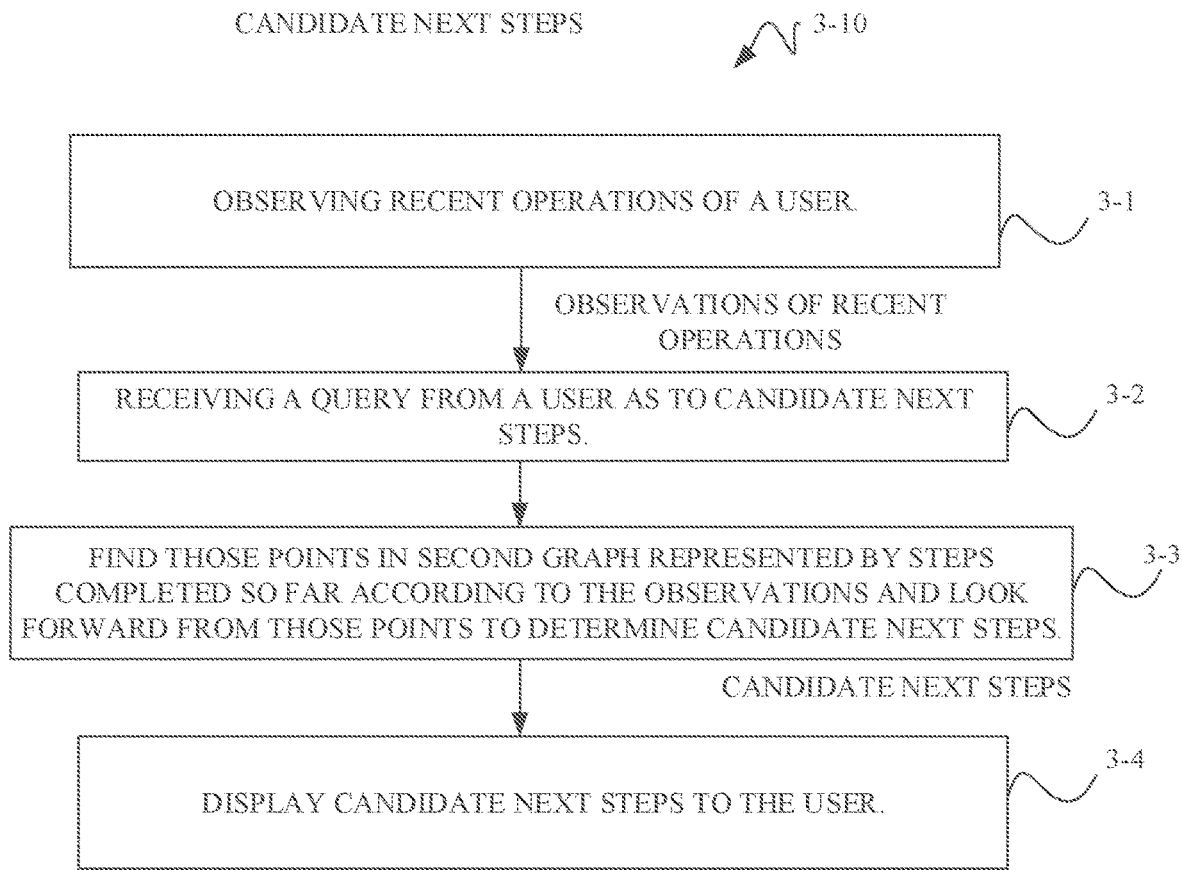
FIG. 3A illustrates a user-assistance function of candidate next steps, according to an example embodiment.
Figure 3B:
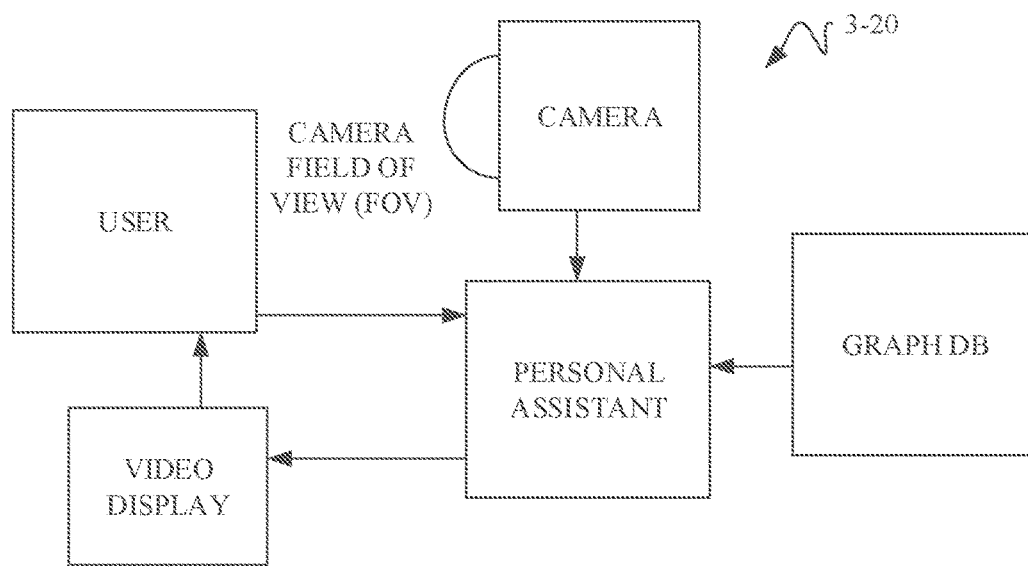
FIG. 3B illustrates a system related to candidate next steps, according to an example embodiment.

FIG. 3A and FIG. 3B refer to a user-assistance function of candidate next steps.

FIG. 3A illustrates logic 3-10 for the user-assistance function of candidate next steps. A personal assistant may observe a user performing some actions. The user may ask the personal assistant what to do next. For example, the user may be cooking something from a recipe or may be performing a repair such as fixing a kitchen sink which will not drain because of a plumbing problem. At operation 3-1, the personal assistant observes recent operations of the user. These observations take the place of the video of operation 1-2 of logic 1-10 of FIG. 1. At operation 3-2 the personal assistant receives a query from the user as to candidate next steps to take moving forward from the current moment in time. At operation 3-3, the personal assistant finds those points in the second graph (refer to operation 1-1 of logic 1-10 for forming the second graph) represented by steps completed so far according to the observations of recent operations of the user. The personal assistant looks forward from those found points corresponding to the current state of operations of the user and determines candidate next steps. At operation 3-4, the candidate next steps are displayed to user.

System 3-20 of FIG. 3B is a system for providing the user-assistance function of candidate next steps to a user. In the example of FIG. 3B, the user is in a field of view (FOV) of a camera coupled to the personal assistant. The personal assistant thus observes operations or actions of the user and is able to correlate these with a second graph obtained from a graph DB. By recognizing the progress of the user through a path in the second graph, the personal assistant can look forward to one or more steps that are possible from the current state in order to progress toward the end point of the graph. The personal assistant may automatically display these next steps through a video display, or may display candidate next steps on demand when queried by the user.

Thus, the user-assistance function in some embodiments is an on-line personal assistant which performs observing one or more recent operations of a user, receiving a query from the user as to candidate next steps, and communicating, based on the query, the second graph and the one or more recent operations of the user, the one or more candidate next steps to the user.

As shown in FIG. 3A and FIG. 3B, embodiments include observing one or more recent operations of the user including receiving video images from a camera. The user is in a FOV of the camera. Embodiments include receiving a query from the user via a user interface. The user interface may be a keyboard, a pointing device, or based on speech recognition. In some embodiments, communicating is performed by a video display visible to the user or by a speaker producing a sound audible to the user.

Overall with respect to FIG. 3A and FIG. 3B, embodiments include obtaining the second graph which encodes topological sorts of the first graph and aligning the second graph to a video. The aligning, in some embodiments obtains a start time and an end time of an event in the video. Embodiments include observing one or more recent operations of the user and receiving a query from the user as to candidate next steps. Embodiments include communicating, based on the query, based on the second graph and based on the one or more recent operations of the user, one or more candidate next steps to the user.

Formation of the first graph and the second graph will now be described.

The first graph, which is a flow graph, may be formed based on a set of text instructions. The formulation of a flow graph is well known and will not be described further.

Forming the second graph includes defining nodes in the second graph as a two tuple (v,P), wherein v is a node in the second graph currently being processed and P is a set of nodes that has already been processed. The second graph may be referred to as a tSort graph. In some embodiments, forming the second graph further includes defining edges in the second graph as satisfying (v,P) to (w,P') is an edge in the second graph if and only if P'=P∪{v}, ancestors of w are in P, and w is not already in P, wherein P and P' are nodes in the second graph, v is a step that has been completed, w is not in P and "U" is a set operator indicating union.

An algorithmic representation of Algorithm 1 (a first algorithm) for forming the second graph is given in Table 1.

TABLE 1

Algorithm 1 (formation of second graph, that is tSort graph)

| Line | Logic | Comment |
|---|---|---|
| 1 | Inputs: G (flow graph), s (root node in G) | G is the first graph, which is a directed acyclic graph (DAG) |
| 2 | $G_{aug}$ = aug(G) | For pairs of distinct nodes (u, v) for which neither u is an ancestor of v, nor v an ancestor u, add edges from u to v and v to u to the augmented graph |
| 3 | $E_{tSort}$ = [ ] | Initialize edge set of the tSort graph |
| 4 | q = queue(s, ∅) | Initialize breadth first search (BFS) queue |
| 5 | while q do | |
| 6 |   v, P = q.pop( ) | Active node v, set of visited nodes P |
| 7 |   for $v_d$ in getDescendants(v, $G_{aug}$) do | |
| 8 |     $P_d$ = P.add($v_d$) | Extend the visited nodes set |
| 9 |     if getPredecessors($v_d$, G) in P then | The path $P_d$ conforms to G |
| 10 |       q.append(($v_d$, $P_d$)) | |
| 11 |       $E_{tSort}$.add(((v, P), ($v_d$, $P_d$))) | Add edge to tSort graph |
| 12 | S = buildGraphFromEdges($E_{tSort}$) | Build the tSort graph |
| 13 | Output S | S is the tSort graph |

Figure 4:
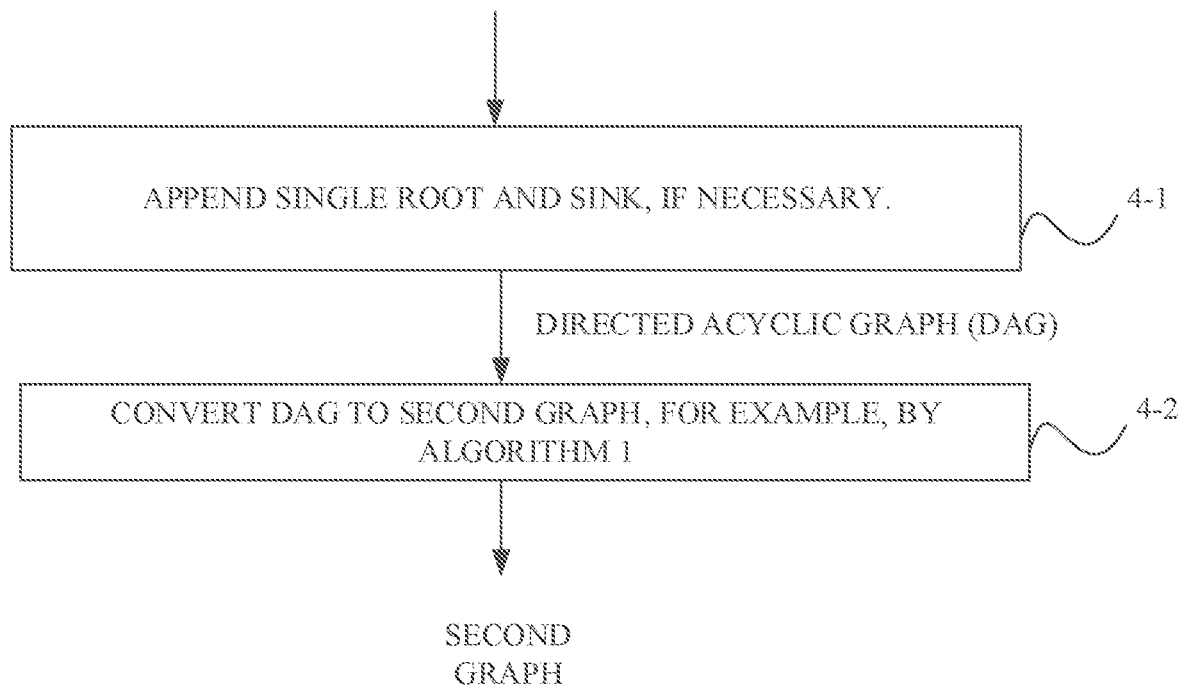
FIG. 4 illustrates logic for forming a second graph from a first graph, according to some embodiments.

FIG. 4 illustrates logic 4-10 for formation of the second graph from the first graph. At operation 4-1, a single root and a sink are attached to the first graph if necessary. The output of operation 4-1 is a directed acyclic graph (DAG). At operation 4-2, the DAG is converted to a second graph. This may be done, as a non-limiting example, using Algorithm 1 (see Table 1).

Given the second graph S (see line 13 of Table 1), graph-to-signal matching is used to match a path through the second graph to the input signal, for example, a video. This matching is also called grounding. Regarding the matching, see for example, FIG. 7 in the upper right, in which Algorithm 2 is used to find a path through the second graph. No annotations are needed on the video x.

Table 2 describes Algorithm 2. Algorithm 2 is a modification of the Drop-DTW algorithm. The Drop-DTW algorithm is described in U.S. application Ser. No. 17/563,813 filed Dec. 28, 2021 published as US Publication No. 2022/0237043 and assigned to the same assignee as the present application. U.S. application Ser. No. 17/563,813 is incorporated by reference herein.

TABLE 2

Algorithm 2 (subsequence alignment, a second algorithm)

| Line | Logic | Comment |
|---|---|---|
| 1 | Inputs: $C \in R^{K \times N}$, $d^x$ | Pairwise match cost matrix and drop costs for elements in x (x is the video) |
| 2 | | Lines 3-5 initialize dynamic programming tables |
| 3 | $D_{0,0}^+ = 0$; $D_{i,0}^+ = \infty$; $D_{0,j}^+ = \infty$; $i \in [[K]], j \in [[N]]$ | Match table |
| 4 | $D_{0,0}^- = 0$; $D_{i,0}^- = \infty$; $D_{0,j}^- = \sum_{k=1}^{j} d_k^x$; $i \in [[K]], j \in [[N]]$ | Drop table |
| 5 | $D_{0,0} = 0$; $D_{i,0} = D_{i,0}^-$; $D_{0,j} = D_{0,j}^-$; $i \in [[K]], j \in [[N]]$ | Optimal solution table |
| 6 | for i = 1, ... , K do | Iterating over elements in Z (nodes in the graph) |
| 7 |   for j = 1, ... , N do | Iterating over elements in X (events in the video) |
| 8 |     $D_{i,j}^+ = C_{i,j}$ + min($D_{i-1,j-1}$, $D_{i,j-1}$, $D_{i-1,j}^+$) | Consider matching $z_i$ to $x_j$ |
| 9 |     $D_{i,j}^- = d_j^x$ + $D_{i,j-1}$ | Consider dropping $x_j$ |
| 10 |     $D_{i,j}$ = min($D_{i,j}^+$, $D_{i,j}^-$) | Select the optimal action |
| 11 |   end for | |
| 12 | end for | |
| 13 | M* = traceback(D) | Compute the optimal alignment by tracing back the minimum cost path |
| 14 | Output: $D_{K,N}$, M* | |

Table 2 shows that Algorithm 2 aligns the second graph to the video by inferring an ordering of steps in the video by applying a dynamic programming recursion. As in Table 2, the dynamic programming recursion which is Algorithm 2 includes determining a plurality of costs associated with a plurality of two-tuples, a first two-tuple of the plurality of two-tuples corresponding to a pairing of a step encoding with a clip from the video, and tracing back among the plurality of two-tuples to find a minimum cost path.

Figure 5:
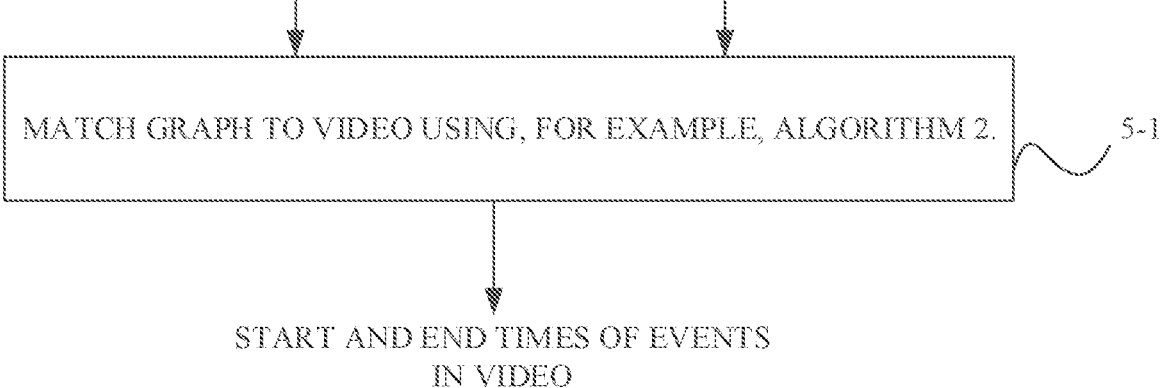
FIG. 5 illustrates logic for matching a graph to a video, according to some embodiments.

FIG. 5 illustrates logic 5-10 for application of Algorithm 2. The second graph and a video are input to operation 5-1. The second graph is matched to the video at operation 5-1, using, for example Algorithm 2 (see Table 2). Start and end times of events in the video are output from operation 5-1.

Figure 6:
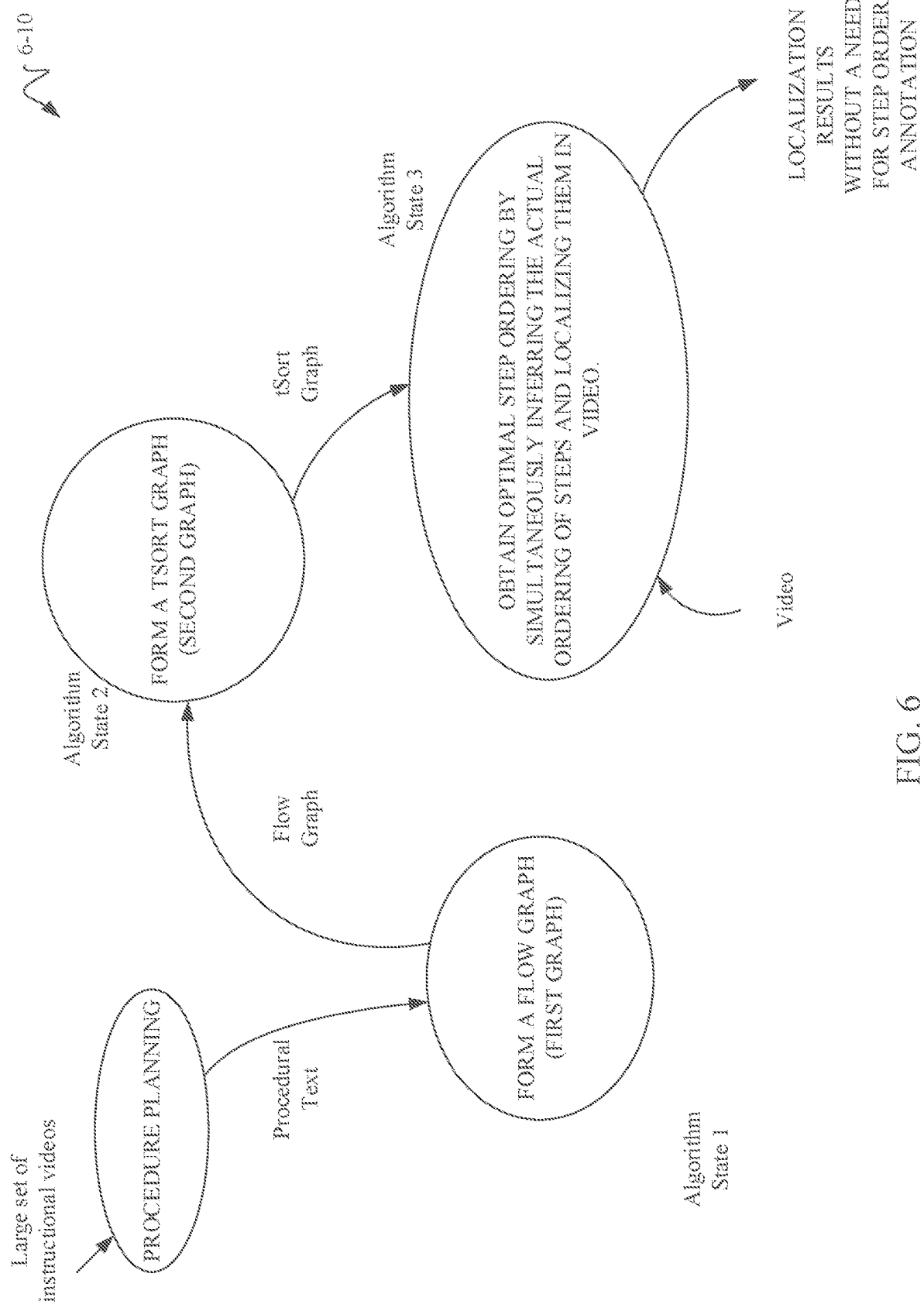
FIG. 6 illustrates an overall algorithm flow, according to an embodiment.

An overall algorithm flow 6-10 of an embodiment is shown in FIG. 6. In this example, a large set of instructional videos are input at the upper left of FIG. 6. Procedure planning, a well-known technique, is then used to obtain procedural text. At algorithm state 1 in the lower left of FIG. 6, a flow graph (the first graph of FIG. 1) is formed using well known techniques. The flow graph is provided to algorithm state 2 in the upper right of FIG. 6. The output of algorithm state 2 is the second graph (using Algorithm 2). The second graph and a video are input to algorithm state 3. No step annotations are needed for the input video. Embodiments only need to know that, overall, the video shows the feasible execution of the process, as specified in the flow graph.

Algorithm state 3 obtains an optimal step ordering by simultaneously inferring the actual ordering of steps and localizing them in the video. The output of overall algorithm flow 6-10 is then localization results without a need for step order annotation.

A brute force approach may enumerate all possible topological sorts on the flow graph and then use sequence to sequence matching, assigning a cost to each match. The sequence with the lowest cost is then output.

Figure 7:
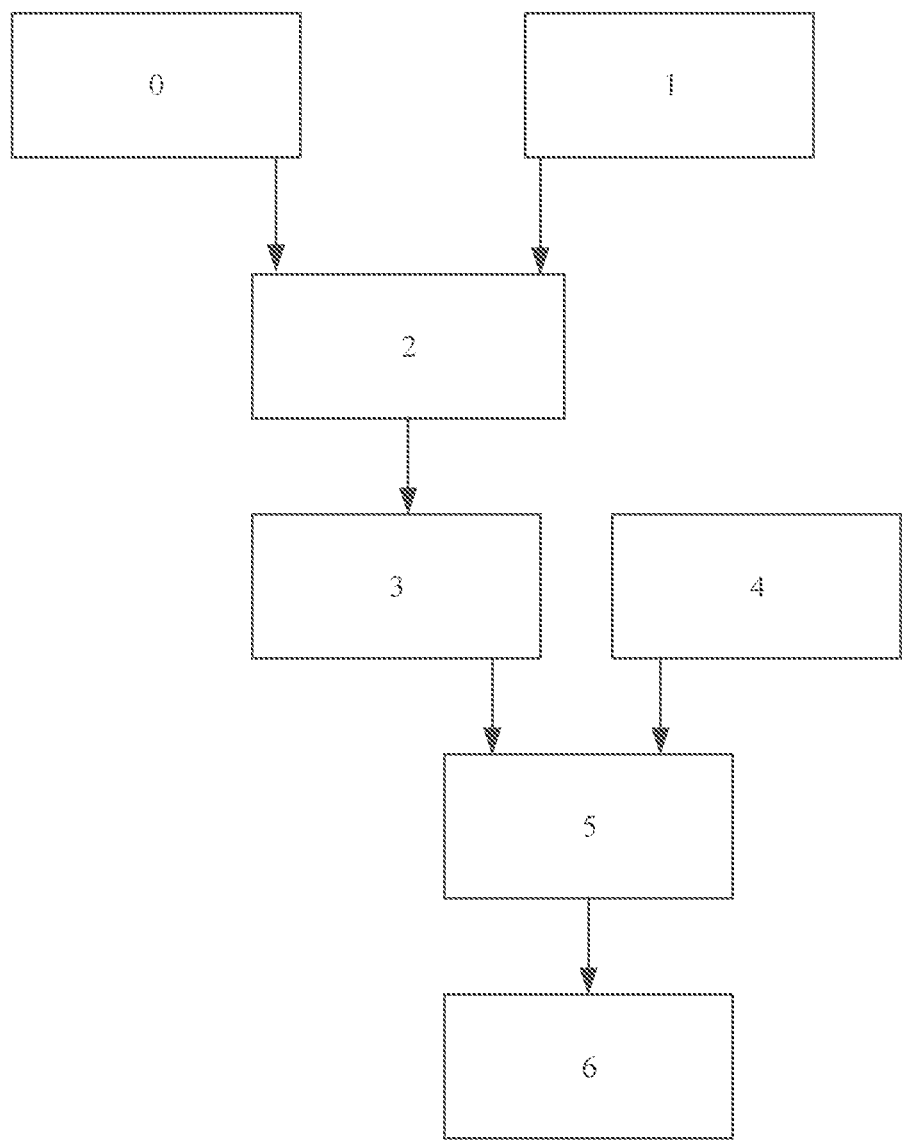
FIG. 7 illustrates an example flow graph.

In an example, a recipe for making a cooled drink including jello may include the following events shown in Table 3 and illustrated by the flow graph in FIG. 7.

Before discussing Table 3, some background is provided here. A flow graph represents a partial ordering of events, specifically some events must be completed before another can begin. The events that must be completed before a specific event can begin are earlier in the partial order, that is there is a path from such an ancestor event to this specific event in the flow graph.

As an example, consider that in FIG. 7 step 0, 1, 2 and 4 are completed. In general, at any stage a set of steps are completed for which all their ancestors in the graph are completed (like 0, 1, 2 and 4).

A sequence of steps which is in a feasible order is called a topological sort.

The intermediate progress through the set of an events according to some topological can be described by a set of completed steps called a front, defined to be the minimal set such that all the completed steps are either in the front or are ancestors of the front. In the above case, the front is 2 and 4.

Embodiments keep track of this front as the procedure is executed in some (a priori unknown) feasible order.

Given the front, a feasible next step is any child node of the front such that all its parents are in the front. In the example 2, 4, this is only the node 3.

Embodiments build a "tSort graph" (the second graph) where there is a 1-1 correspondence between nodes and (feasible) fronts. In this graph, any feasible execution order is represented simply as a path from the source to sink and, vice versa, any path from source to sink in the tSort graph corresponds to a feasible execution ordering.

Returning to Table 3, please also see FIG. 7 for event steps and event orderings.

TABLE 3

| Event step (see FIG. 7) | Event description | Step which must precede this step (see FIG. 7) |
| --- | --- | --- |
| 0 | Pour water | Not applicable |
| 1 | Pour alcohol | Not applicable |
| 2 | Mix water and alcohol | 0 and 1 |
| 3 | Put the mixture into the refrigerator | 2 |
| 4 | Mix water with jello powder | Not applicable |
| 5 | Stir in the chilled water and alcohol mixture | 3 and 4 |
| 6 | Pour the mixture into cups | 5 |

The flow graph in FIG. 7 has ten different topological orderings. In this simple case, it would be possible to apply brute force to list the ten topological orderings and match each one with an input video.

However, the brute force is not feasible for even smalls sets of instructions.

Consider a flow graph with T sequential threads, with the number of nodes in the first thread being n1, the number of nodes in the second thread being n2, and so on up to nT. In an example, the total number of nodes in the flow graph is n1+n2+n3+ . . . +nT.

$$\text{Number of possible topological sorts} = \frac{n!}{n1!n2!\ldots nT!} \quad \text{Eqtn. 1}$$

In Eqtn. 1, n! represents n factorial.

The speedup using the tSort graph found by Algorithm 1 and matching using Algorithm 2 is shown, as an example, in Table 4.

TABLE 4

Speed up of Algorithm 2 over brute force approach (notation: 1e2 = 100, 1en = $10^n$).

| Total number of nodes, n | Number of threads, T | | | |
| --- | --- | --- | --- | --- |
|  | 2 | 3 | 4 | 5 |
| 20 | 1e2 | 1e5 | 1e8 | 1e11 |
| 40 | 1e5 | 1e8 | 1e15 | 1e20 |
| 60 | 1e11 | 1e20 | 1e27 | 1e33 |

FIG. 7 illustrates a comparison 8-10 of the flow of data in a brute force approach to an example embodiment.

Figure 8:
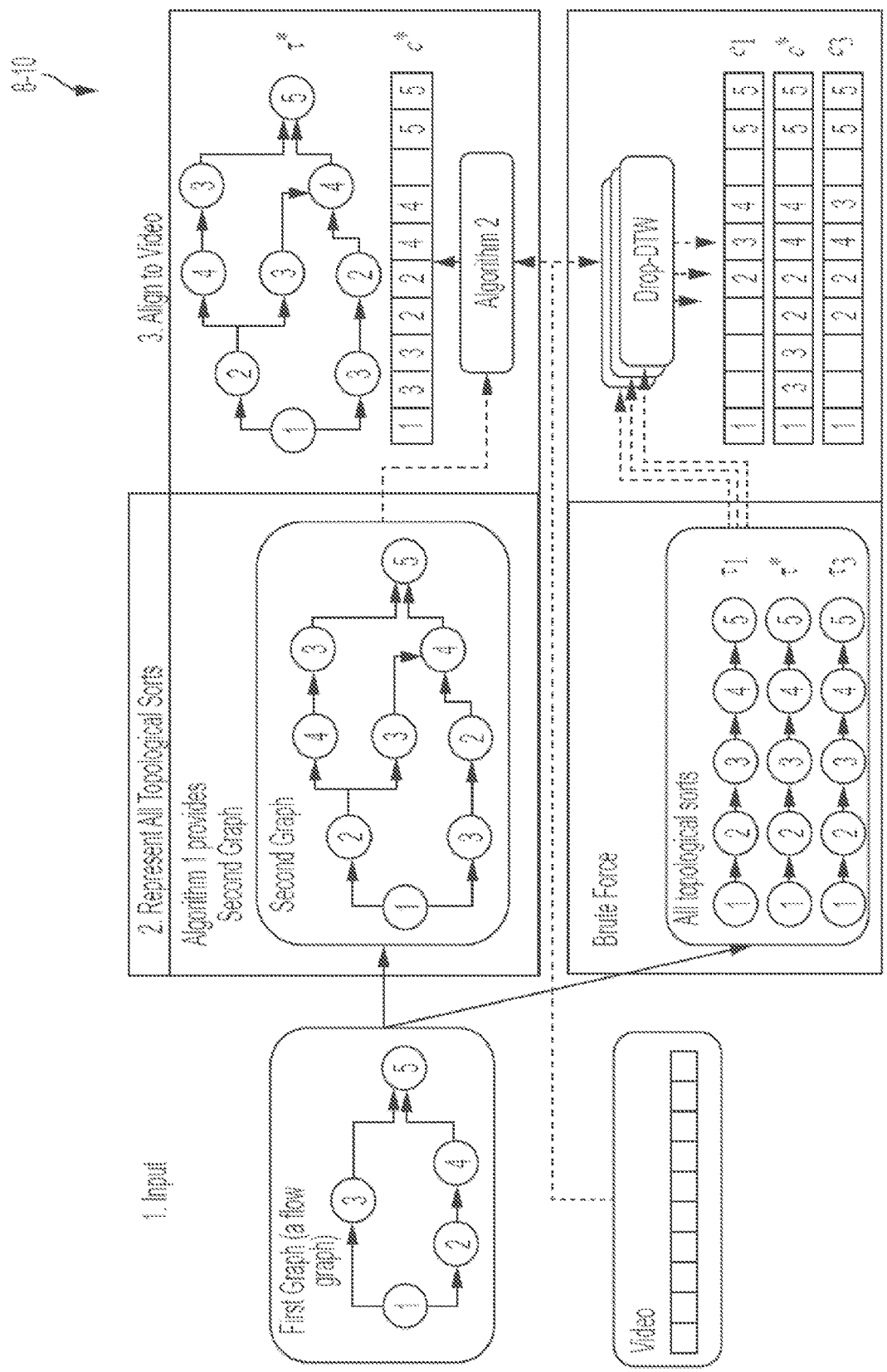
FIG. 8 contrasts an embodiment with a brute force approach.

On the upper left of FIG. 8 is shown a flow graph and in the lower right a video is represented schematically as a sequence of events. FIG. 8 is not the same flow graph as in FIG. 7. Not all of the events in the video are in the flow graph. For example, if the video shows someone making something using a recipe such as FIG. 7, the person may introduce themselves, interrupt to tell a story, or sell something. These other events are also in the video, although there is no correspondence to an event in the flow graph.

In the brute force approach, all topological sorts are found in the lower middle portion of FIG. 8 (example candidate sequences are $\tau_1$, $\tau^*$, and $\tau_3$). The video is then compared with each sequence from the set of all possible topological sorts. An algorithm such as Drop-DTW may be used to match each of the candidate sequences with the video. The matching results are shown in the lower right of FIG. 8, among these are examples $c_1$, $c^*$, $c_3$. A matching result shows an event in a video which matches with a node in the candidate sequence. $c^*$ has the lowest alignment cost and corresponds to candidate sequence $\tau^*$.

In an embodiment of the application, the second graph is found from the first graph using Algorithm 1 as shown in the top middle of FIG. 8. The video is then compared with the second graph using Algorithm 2 on the upper right portion of FIG. 8. Embodiments do not exhaustively determine all threads through the second graph. Instead, a dynamic programming recursion as in Algorithm 2 is used to find the best-matching thread.

As shown in FIG. 8, embodiments include obtaining a second graph using Algorithm 1, formed from a first graph, in which the first graph is a flow graph. The second graph encodes topological sorts of the first graph. Embodiments also include aligning the second graph to a video using Algorithm 2. The aligning obtains a start time and an end time of an event in the video as described with respect to FIG. 2A. Generally there are many events and Algorithm 2 finds a start time and an end time for each event in the thread with the lowest cost (best alignment). The one or more events are covered by the second graph, which means that the one or more events are in the domain of the second graph. Embodiments also include performing a user-assistance function based on the start time and the end time of the event (not shown in FIG. 8, but see FIGS. 2A and 3A).

Referring again to FIG. 8, again as in the brute force approach, $c^*$ found by Algorithm 2 has the lowest alignment cost and corresponds to candidate sequence $\tau^*$. However, the application of Algorithm 2 is very efficient as shown in Table 4.

Figure 9:
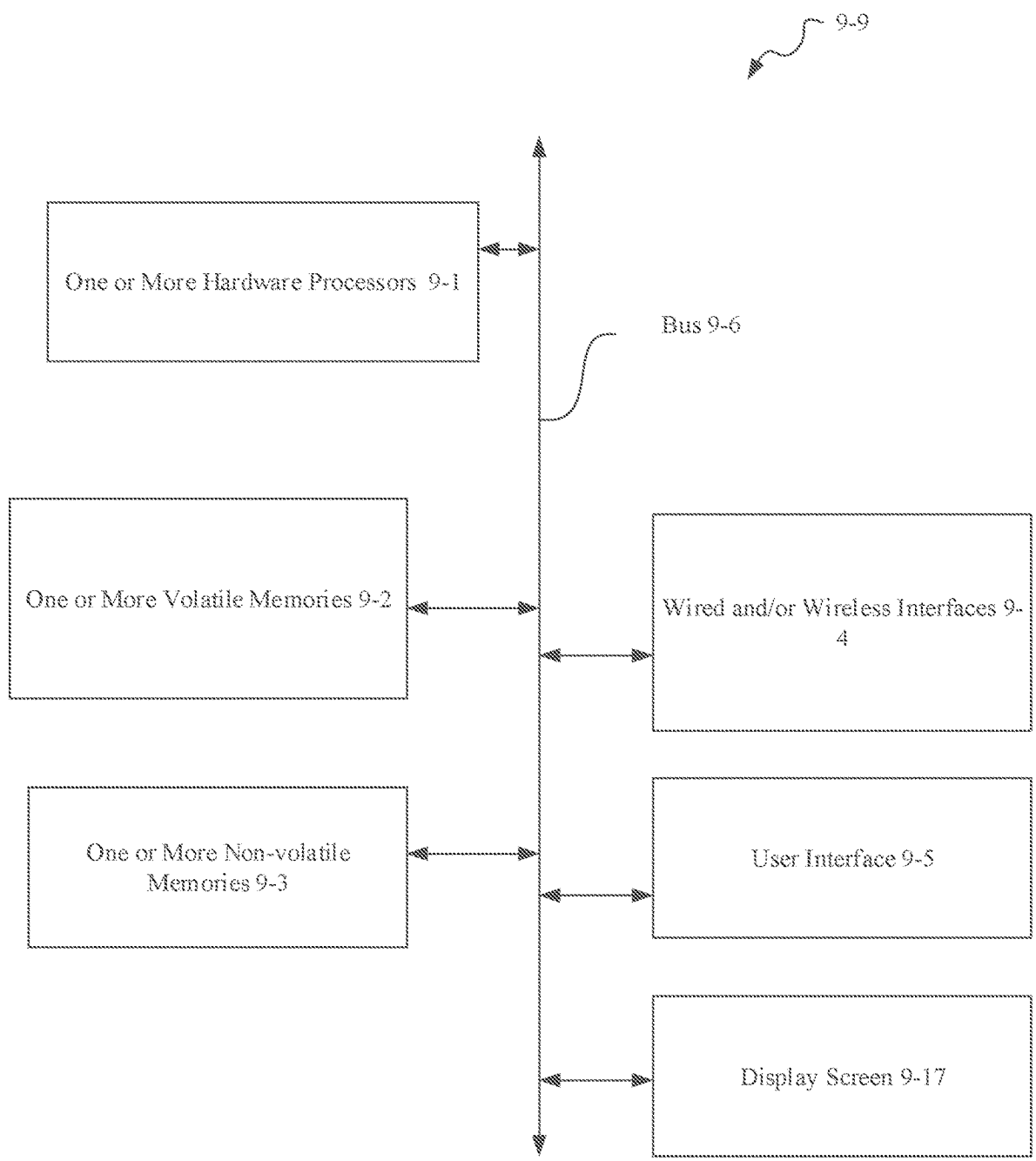
FIG. 9 illustrates exemplary hardware for implementation of computing devices for implementing the systems and algorithms described by the figures, according to some embodiments.

FIG. 9 illustrates exemplary hardware for implementation of computing devices for implementing the systems and algorithms described by the figures, according to some embodiments.

Hardware for performing embodiments provided herein is now described with respect to FIG. 9. FIG. 9 illustrates an exemplary apparatus 9-1 for implementation of the embodiments disclosed herein. The apparatus 9-1 may be a server, a computer, a laptop computer, a handheld device, or a tablet computer device, for example. Apparatus 9-1 may include one or more hardware processors 9-9. The one or more hardware processors 9-9 may include an ASIC (application specific integrated circuit), CPU (for example CISC or RISC device), and/or custom hardware. Apparatus 9-1 also may include a user interface 9-5 (for example a display screen and/or keyboard and/or pointing device such as a mouse). Apparatus 9-1 may include one or more volatile memories 9-2 and one or more non-volatile memories 9-3. The one or more non-volatile memories 9-3 may include a non-transitory computer readable medium storing instructions for execution by the one or more hardware processors 9-9 to cause apparatus 9-1 to perform any of the methods of embodiments disclosed herein.

What is claimed is:

1. An apparatus comprising:
   one or more processors; and
   one or more memories storing instructions, wherein an execution by the one or more processors of the instructions is configured to cause the apparatus to:
   obtain a second graph, wherein the second graph is formed from a first graph, wherein the first graph is a flow graph and the second graph encodes topological sorts of the first graph;
   align the second graph to a video, wherein the aligning obtains a start time and an end time of an event in the video; and
   perform a user-assistance function based on the start time and the end time of the event.

2. The apparatus of claim 1, wherein the user-assistance function is a providing of content addressability to a user, wherein the execution by the one or more processors of the instructions is further configured to cause the apparatus to:
   receive, from the user, a query as to the event in the video;
   cue, based on the query and the second graph, the video to the start time of the event in the video; and
   display the video to the user beginning at the start time of the event.

3. The apparatus of claim 2, wherein the execution by the one or more processors of the instructions is further configured to cause the apparatus to:
   obtain the video from a video database; and
   obtain the second graph from a graph database.

4. The apparatus of claim 1, wherein the user-assistance function is an on-line personal assistant, and wherein the execution by the one or more processors of the instructions is further configured to cause the apparatus to:
   observe one or more recent operations of a user;
   receive a query from the user as to candidate next steps; and
   communicate, based on the query, the second graph and the one or more recent operations of the user, one or more candidate next steps to the user.

5. The apparatus of claim 1, wherein the execution by the one or more processors of the instructions is further configured to cause the apparatus to form the first graph from a set of text instructions.

6. The apparatus of claim 1, wherein the execution by the one or more processors of the instructions is further configured to cause the apparatus to form the second graph by defining nodes in the second graph as a two tuple (v,P), wherein v is a node in the second graph currently being processed and P is a set of nodes that has already been processed.

7. The apparatus of claim 6, wherein the execution by the one or more processors of the instructions is further configured to cause the apparatus to form the second graph by defining edges in the second graph as satisfying (v,P) to (w,P') is an edge in the second graph if and only if $P'=P \cup \{v\}$, ancestors of w are in P, and w is not already in P, wherein P and P' are nodes in the second graph, v is a step that has been completed, w is not in P and "U" is a set operator indicating union.

8. The apparatus of claim 1, wherein the execution by the one or more processors of the instructions is further configured to cause the apparatus to align the second graph to the video by inferring an ordering of steps in the video by applying a dynamic programming recursion.

9. The apparatus of claim 8, wherein the dynamic programming recursion comprises:
   determining a plurality of costs associated with a plurality of two-tuples, a first two-tuple of the plurality of two-tuples corresponding to a pairing of a step encoding with a clip from the video; and
   tracing back among the plurality of two-tuples to find a minimum cost path.

10. A non-transitory computer readable medium storing instructions for execution by a computer, wherein the execution by the computer of the instructions is configured to cause the computer to:
    obtain a second graph, wherein the second graph is formed from a first graph, wherein the first graph is a flow graph and the second graph encodes topological sorts of the first graph;
    align the second graph to a video, wherein the aligning obtains a start time and an end time of an event in the video; and
    perform a user-assistance function based on the start time and the end time of the event.

11. The non-transitory computer readable medium of claim 10, wherein the user-assistance function is a providing of content addressability to a user, wherein the execution by the computer of the instructions is further configured to cause the computer to:
    receive, from the user, a query as to the event in the video;
    cue, based on the query and the second graph, the video to the start time of the event in the video; and
    display the video to the user beginning at the start time of the event.

12. The non-transitory computer readable medium of claim 11, wherein the execution by the computer of the instructions is further configured to cause the computer to:
    obtain the video from a video database; and
    obtain the second graph from a graph database.

13. The non-transitory computer readable medium of claim 10, wherein the user-assistance function is an on-line personal assistant, and wherein the execution by the computer of the instructions is further configured to cause the computer to:
    observe one or more recent operations of a user;
    receive a query from the user as to candidate next steps; and communicate, based on the query, the second graph and the one or more recent operations of the user, one or more candidate next steps to the user.

14. The non-transitory computer readable medium of claim 10, wherein the execution by the computer of the instructions is further configured to cause the computer to form the first graph from a set of text instructions.

15. The non-transitory computer readable medium of claim 10, wherein the execution by the computer of the instructions is further configured to cause the computer to form the second graph by defining nodes in the second graph as a two tuple (v,P), wherein v is a node in the second graph currently being processed and P is a set of nodes that has already been processed.

16. The non-transitory computer readable medium of claim 15, wherein the execution by the computer of the instructions is further configured to cause the computer to form the second graph by defining edges in the second graph as satisfying (v,P) to (w,P') is an edge in the second graph if and only if P'=P∪{v}, ancestors of w are in P, and w is not already in P, wherein P and P' are nodes in the second graph, v is a step that has been completed, w is not in P and "∪" is a set operator indicating union.

17. The non-transitory computer readable medium of claim 10, wherein the execution by the computer of the instructions is further configured to cause the computer to align the second graph to the video by inferring an ordering of steps in the video by applying a dynamic programming recursion.

18. The non-transitory computer readable medium of claim 17, wherein the dynamic programming recursion comprises:
    determining a plurality of costs associated with a plurality of two-tuples, a first two-tuple of the plurality of two-tuples corresponding to a pairing of a step encoding with a clip from the video; and
    tracing back among the plurality of two-tuples to find a minimum cost path.

\* \* \* \* \*